United States Patent

[11] 3,571,938

[72] Inventor Bruce W. Branick
 3800 27th St., Port Arthur, Tex. 77640
[21] Appl. No. 786,169
[22] Filed Dec. 23, 1968
[45] Patented Mar. 23, 1971

[54] AIRCRAFT ATTITUDE INDICATOR
 10 Claims, 6 Drawing Figs.
[52] U.S. Cl. .................................................... 33/206,
 116/129, 33/215
[51] Int. Cl. ............................................. G01c 9/20
[50] Field of Search ........................................ 33/206,
 206.2, 206.2B, 215.2, 220; 116/129, (Navigation)

[56] References Cited
UNITED STATES PATENTS

| 1,359,711 | 11/1920 | Kelnev | 33/206(.2B) |
| 1,903,911 | 4/1933 | Meador | 33/206 |
| 2,181,444 | 11/1939 | Zook | 33/215(.2) |
| 2,328,730 | 9/1943 | Lorensen | 33/215(.2) |
| 2,677,193 | 5/1954 | Truppe | 33/206 |

FOREIGN PATENTS

| 544,493 | 1957 | Canada | 116/129 |

Primary Examiner—Leonard Forman
Assistant Examiner—Dennis A. Dearing
Attorney—Everett G. Clements

ABSTRACT: An aircraft attitude indicator having a float for oscillation about a horizontal axis and for rotation about an axis normal to said axis. Indicating markings carried by the float and casing provide for fast observation of the attitude of the craft. An adjustable horizontal marker is provided for compensating for the trim of the craft.

PATENTED MAR 23 1971

3,571,938

SHEET 1 OF 2

INVENTOR
BRUCE W. BRANICK

BY
ATTORNEY

PATENTED MAR 23 1971
3,571,938
SHEET 2 OF 2
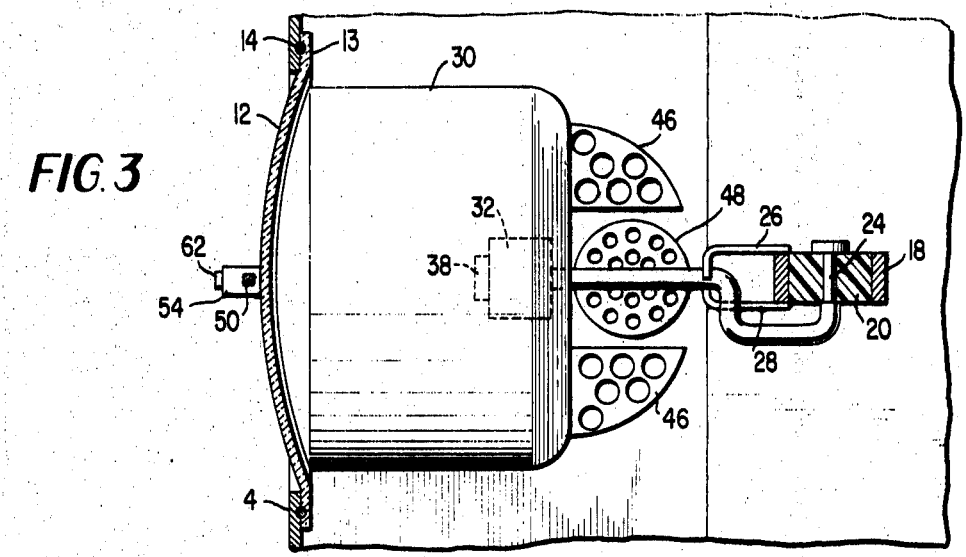
FIG. 3
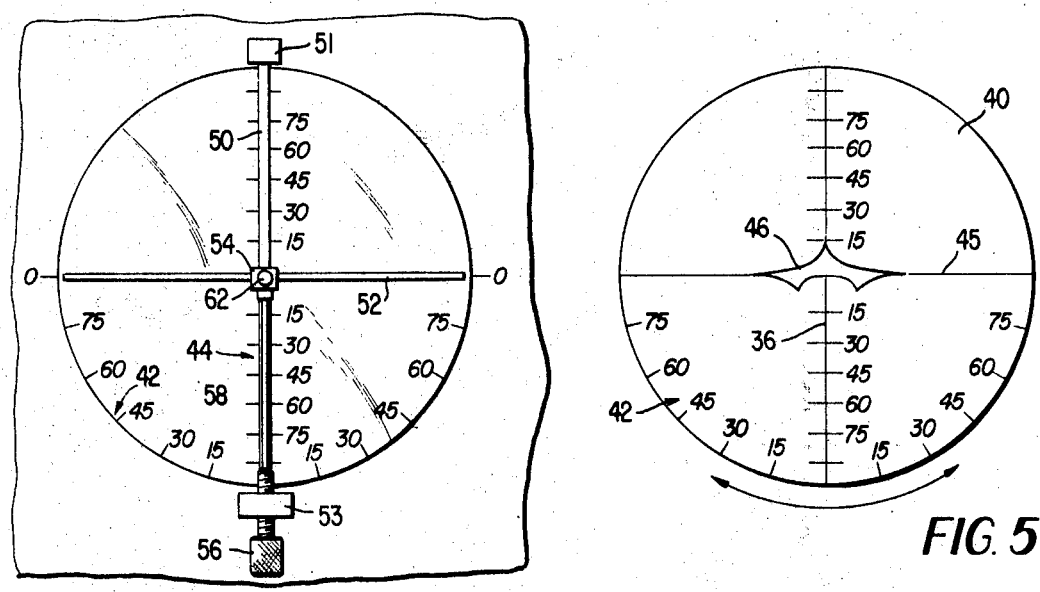
FIG. 4
FIG. 5
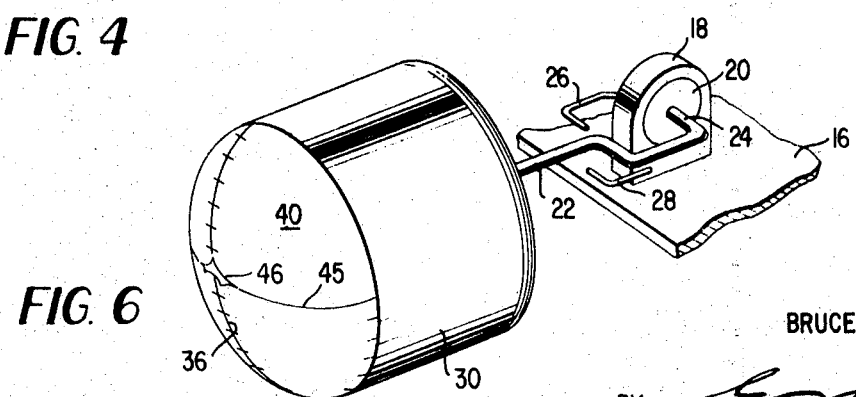
FIG. 6
INVENTOR
BRUCE W. BRANICK
BY 
ATTORNEY

AIRCRAFT ATTITUDE INDICATOR

DISCLOSURE OF THE INVENTION

This invention relates to an aircraft attitude indicator.

It is an object of this invention to provide an attitude indicator for aircraft which can be adjusted to compensate for variations in the trim of the craft.

It is a further object of this invention to provide an attitude indicator as aforesaid in which the bank and inclination of the craft can be accurately determined by a glance at the instrument.

It is a further object of this invention to produce a device as aforesaid with which contains no parts that require high precision in manufacture.

It is a further object of this invention to provide a device as aforesaid which is very accurate.

Figure 1:
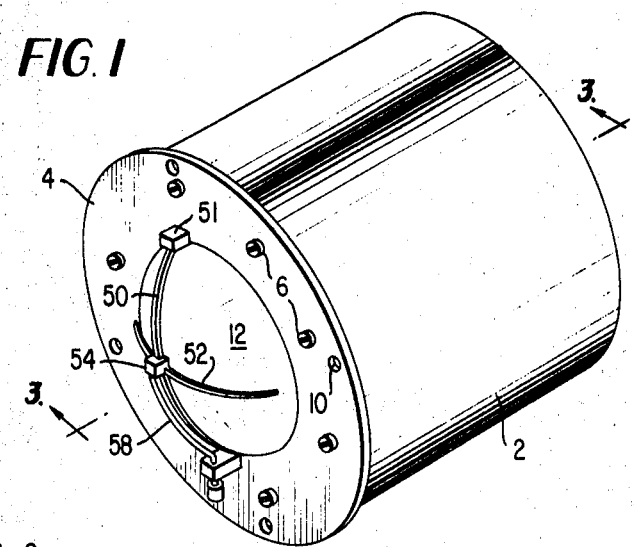
Figure 2:
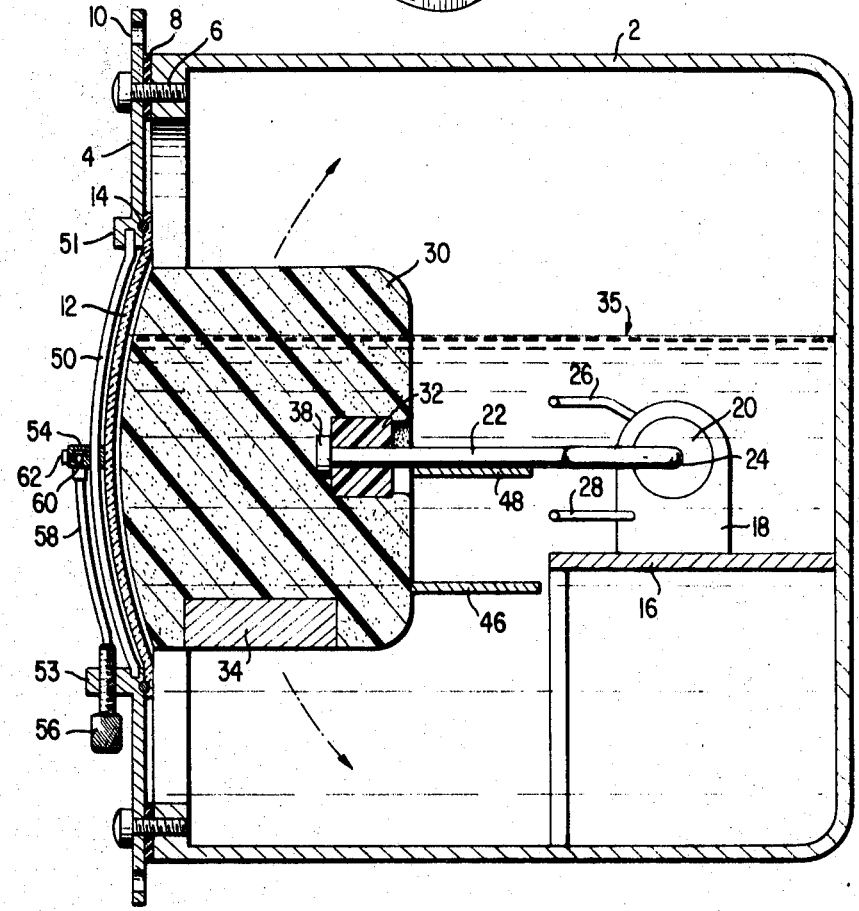

These and other objects of the invention will become manifest upon reading the following description in conjunction with the accompanying drawings wherein:

FIG. 1 is a perspective view of the indicator;
FIG. 2 is a longitudinal section taken through FIG. 1;
FIG. 3 is a section taken on line 3-3 of FIG. 1;
FIG. 4 is a partial end view of FIG. 1;
FIG. 5 is an end view of the float; and
FIG. 6 is a perspective view of the float mechanism.

With reference to the drawings there is disclosed a casing in the form of a cup-shaped housing 2. A mounting plate 4 is secured in fluidtight relation to the open end of the cup by bolts 6 and a gasket 8 and is formed with openings 10 for mounting on a support. A spherical outwardly curved window 12 has an annular flat mounting flange 13 which is secured to plate 4 in fluidtight relation by means of any suitable bonding material and a gasket 14.

A rigid horizontal support 16 is mounted in the housing 2 and carries a bearing pedestal 18 in which is secured an antifriction bearing 20 preferably formed of a synthetic plastic such as "Teflon." A rod 22 having at one end a laterally extending leg 24 is pivotally mounted by the leg for oscillation in the bearing 20. The arc of oscillation is limited by stops 26, 28 secured to the pedestal 18.

A float 30 is provided with a bearing 32 somewhat similar to the bearing 20 and is mounted for free rotary movement about the forward end of the rod 22. A weight 34 of sufficient mass to retain the float by its weight almost completely submerged in the liquid in the casing as shown at 35. The weight 34 is moulded integral with the material of the float. The mass of the weight is thus also sufficient to rotate the float on the rod as an axis to thereby maintain a radius and line 36 through the weight in a position normal to the horizon line 45 also inscribed on the face of the float. The bearing 32 is formed slightly larger than the opening in the float and is made in sections that can be assembled around the rod and then be forced into the opening to remain assembled and to hold captive an enlarged head 38 formed on the end of the rod.

The float is preferably formed of a synthetic plastic that will not be affected by the liquid in the casing. The liquid is preferably of a material that will not freeze under the temperatures encountered in flight. Styrofoam and alcohol have been tried as the plastic and fluid and have worked well. However, the float could obviously be made of other materials as for instance a metal shell, if desired.

The float is formed with a spherical face 40 generated from the same center as the window 12 and has an accurate scale 42 and a vertical scale 44 inscribed thereon to indicate the angles of bank and inclination of the plane on which the instrument is fixedly mounted. A surrogate 46 is mounted along the horizontal circumference of the surface.

The float and rod are provided with baffles 46, 48 to dampen violent motion of the float in the liquid.

A track of a noncircular cross section is secured to the casing as by being fitted into recesses formed in protuberances 51, 53 of plate 4. See FIGS. 1 and 4. An adjustable horizon marker 52 is formed with a guide box 54 having an opening therethrough congruent in shape to the cross-sectional shape of the track for guided movement along the track. Protuberance 53 is threaded to receive a threaded member 56 having secured thereto a flexible shaft 58 formed with a recess 60 at the free end. Box 54 is provided with a circular opening to rotatably receive the flexible shaft and is provided with a set screw 62 having an end fitted into recess 60. Rotation of threaded member 56 will cause the member to travel longitudinally in protuberance 53 and will drive the horizontal marker along the track 50. The angle of bank is indicated by using scale 42 and the track 50 as the reference. The angle of inclination is indicated by using scale 44 and the horizon marker as the reference. The bank of the craft can be easily seen by noting the angle the surrogate forms with the horizon marker, and the horizon marker can be adjusted by rotation of member 56.

I claim:

1. A flight attitude indicator for aircraft comprising a casing, a fluid in said casing, an eccentrically weighted float, means pivotally mounting the float in the casing for swinging in a vertical plane about a horizontal axis and for rotary movement about an axis normal thereto, said two axes intersecting at a point horizontally displaced from the float, said float being buoyed by said fluid causing said swinging in response to a change in attitude of said indicator, a sight window in the case for viewing the float, indicating markings on the float for indicating the angle of the bank, and a fixed reference carried by the casing for cooperation with said markings to indicate the angle of bank.

2. An indicator as defined in claim 1 further including a surrogate marking on the float and a horizon marker mounted over said sight window externally of the casing for cooperation with the surrogate to indicate the bank of the craft.

3. An indicator as defined in claim 2 further including means for vertically adjusting the horizon marker.

4. An indicator as defined in claim 3 wherein the means for vertically adjusting the marker comprises a track secured to and externally of the casing and transversing the window, guide means for guiding the marker for travel on the track, and means secured to the casing for driving the marker over the track.

5. An indicator as defined in claim 4 wherein the means for driving the marker comprises a manually adjustable screw and a flexible shaft secured to said screw and rotatable in the marker.

6. An indicator as defined in claim 1 further including indicating markings on the flat for indicating the inclination of the craft and means secured to the casing for cooperation with said further markings to indicate the angle of inclination.

7. An indicator as defined in claim 1 wherein the means mounting the float for swinging comprises a bearing secured in the casing and a rod pivotally mounted by one end in said bearing.

8. An indicator as defined in claim 7 wherein the means mounting the float for rotary movement comprises a bearing carried by the float mounted on the other end of the rod.

9. An indicator as defined in claim 8 further including means secured to the bearing secured in the casing for limiting the arc swinging of the float.

10. An indicator as defined in claim 9 further including baffles secured to said rod and float for damping the swinging and rotation of the float in a liquid.